Jan. 27, 1925. 1,524,068
J. WALLACE
INK PENCIL
Filed June 25, 1921 3 Sheets-Sheet 2

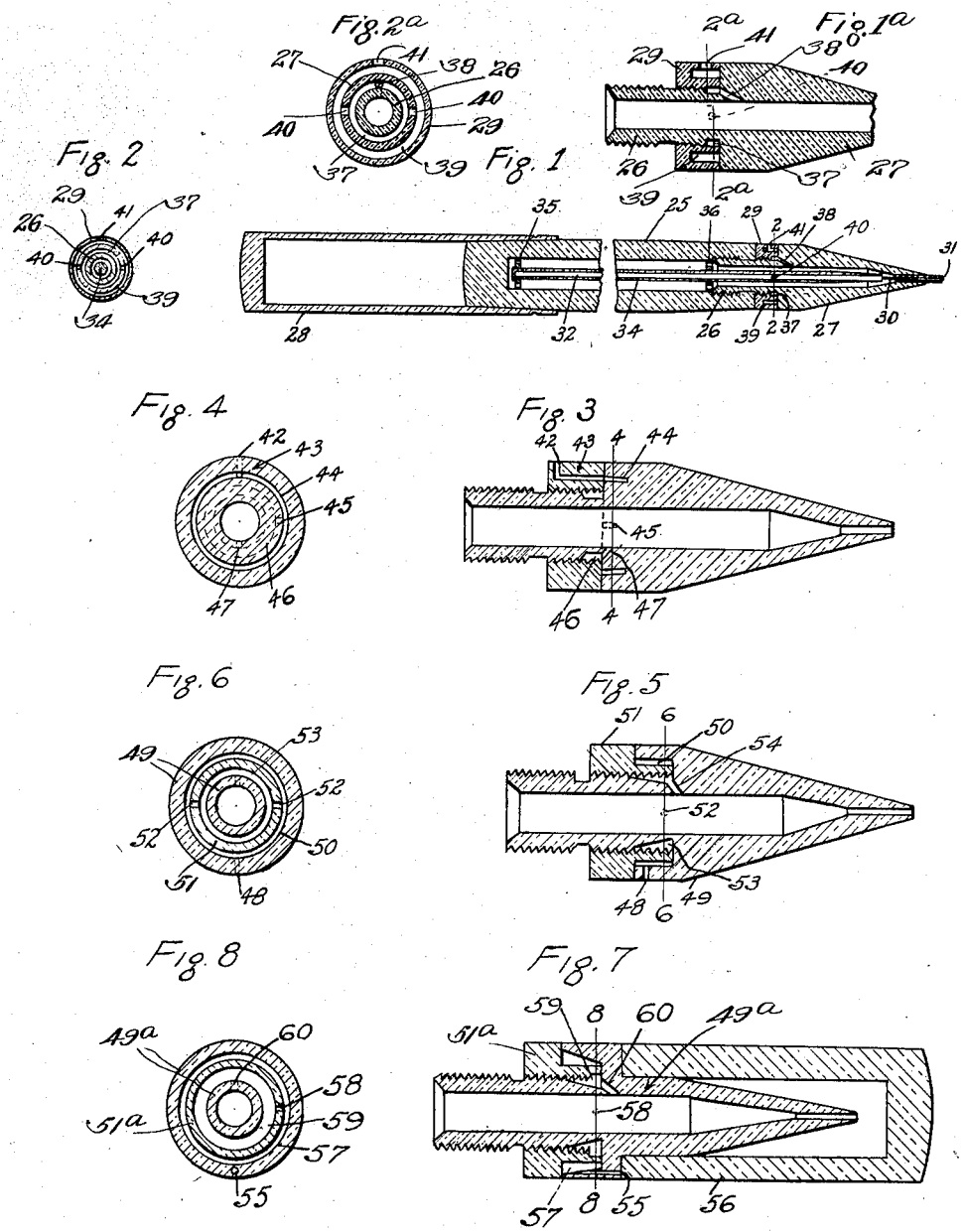

Inventor
Joseph Wallace
By His Attorney

Jan. 27, 1925.  1,524,068

J. WALLACE

INK PENCIL

Filed June 25, 1921    3 Sheets-Sheet 3

Inventor
Joseph Wallace
By His Attorney

Patented Jan. 27, 1925.

1,524,068

UNITED STATES PATENT OFFICE.

JOSEPH WALLACE, OF NEW YORK, N. Y.

INK PENCIL.

Application filed June 25, 1921. Serial No. 480,257.

*To all whom it may concern:*

Be it known that I, JOSEPH WALLACE, a citizen of the United States, in the county of Bronx, city and State of New York, have invented a new and useful Improvement in Ink Pencils, of which the following is a specification.

My invention relates particularly to that class of ink pencils in which the ink is contained within the barrel and separable section, and flows therefrom to and around a retractible needle projecting through an aperture in the point of the section.

The primary object of my invention is to provide for the admission of air into the interior ink reservoir while the ink is being emitted in writing, and at the same time provide against the leakage of ink outward through the air inlet at all times.

A further object of my invention is to insure the efficient action of the needle in opening, closing and cleaning the aperture in the point.

I attain these and other ends first, by a novel construction and arrangement of the air vents and ducts, which permits the air to enter without permitting the ink to escape, and, secondly, by a special construction and prolongation of the stem of the needle into the barrel.

In order that my invention may be fully understood, I shall first describe in detail various preferred and alternative constructions and arrangements of the air inlet and of the needle stem in accordance with my invention, and then point out the novel features of the invention in the claims.

Reference is to be had to the accompanying drawings forming part of this specification in which the same reference numbers designate corresponding parts in all the figures.

Figure 1 is an enlarged longitudinal sectional view of a preferred form of ink pencil embodying my invention.

Figure 2 is a cross-sectional view of the same on the line 2—2, Figure 1.

Figure 1ª is an enlarged longitudinal sectional view of parts shown in Figure 1; Figure 2ª is a cross-sectional view on the line 2ª 2ª of Figure 1ª.

Figure 3 is an enlarged longitudinal sectional view of another embodiment of my invention.

Figure 4 is a cross-sectional view of the same on the line 4—4, Figure 3.

Figure 5 is an enlarged longitudinal sectional view of another embodiment of my invention.

Figure 6 is a cross-sectional elevation of the same on the line 6—6, Figure 5.

Figure 7 is an enlarged longitudinal sectional view of another embodiment of my invention.

Figure 8 is a cross-sectional view of the same on the line 8—8, Figure 7.

Figure 9:
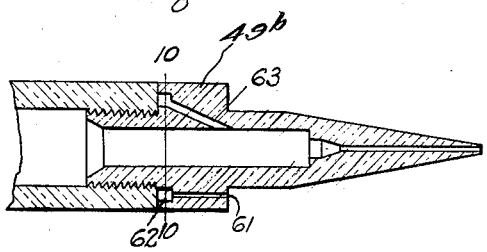

Figure 9 is an enlarged longitudinal sectional view of another embodiment of my invention.

Figure 10:
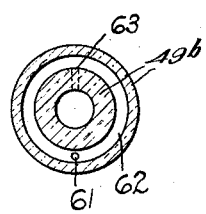

Figure 10 is a cross-sectional elevation of the same on the line 10—10, Figure 9.

Figure 11:
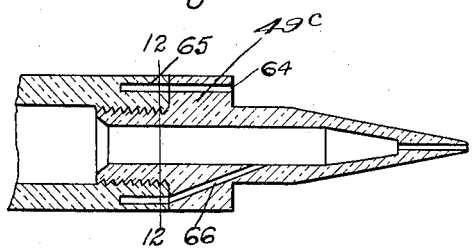

Figure 11 is an enlarged longitudinal sectional view of another embodiment of my invention.

Figure 12:
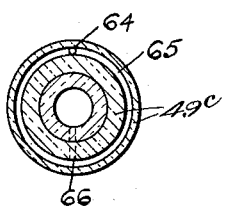

Figure 12 is a cross-sectional view of the same on the line 12—12, Figure 11.

Figure 13:
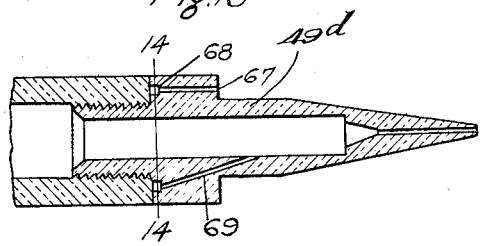

Figure 13 is an enlarged longitudinal sectional view of another embodiment of my invention.

Figure 14:
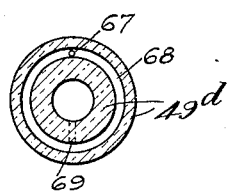

Figure 14 is a cross-sectional view of the same on the line 14—14, Figure 13.

Figure 15:
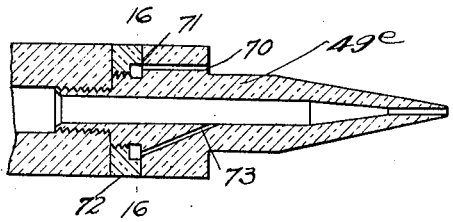

Figure 15 is an enlarged longitudinal sectional view of another embodiment of my invention.

Figure 16:
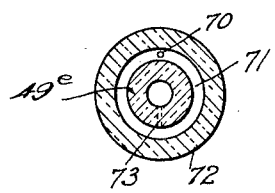

Figure 16 is a cross-sectional view of the same on the line 16—16, Figure 15.

Figure 17:
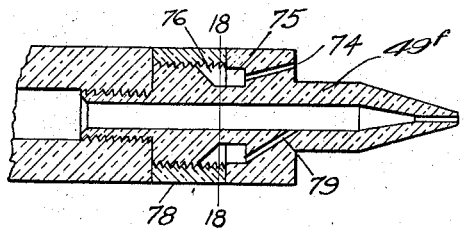

Figure 17 is an enlarged longitudinal sectional view of another embodiment of my invention.

Figure 18:
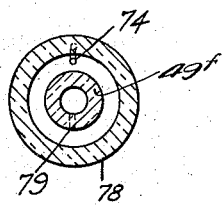

Figure 18 is a cross-sectional view of the same on the line 18—18, Figure 17.

Figure 19:
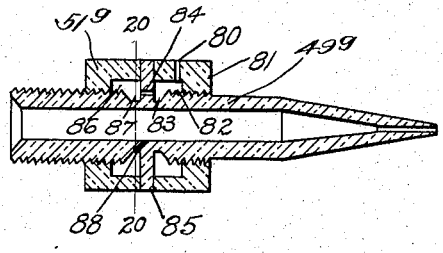

Figure 19 is an enlarged longitudinal sectional view of another embodiment of my invention.

Figure 20:
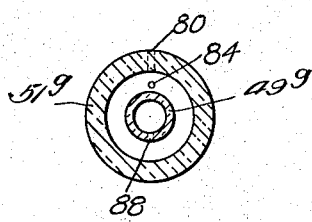

Figure 20 is a cross-sectional view of the same on the line 20—20, Figure 19.

Figure 21:
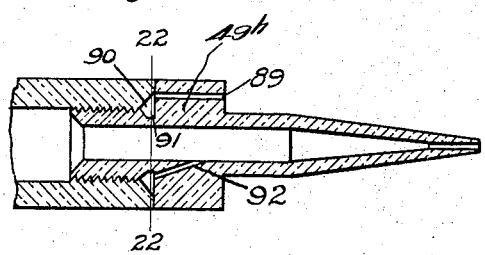

Figure 21 is an enlarged longitudinal sectional view of another embodiment of my invention.

Figure 22:
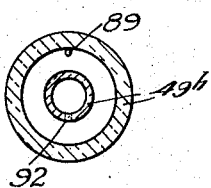

Figure 22 is a cross-sectional view of the same on the line 22—22, Figure 21.

Referring first to Figures 1 and 2 of the drawings, 25 is the barrel having its lower end internally threaded to fit and receive the externally threaded extension 26 of the point section 27; 28 is the cap here shown transferred to the upper end of the barrel to leave the point uncovered for writing; 29 is an internally threaded sleeve screwing on the threaded extension 26 of the point section between the section and the barrel, an annular clearance groove being formed around the extension 26 immediately above the sleeve 29; 30 is the longitudinally retractible needle projecting through the end hole 31 in the point and having a stem 32 which I prefer to prolong as shown into the full length of the barrel 25, and to form of a heavy metal core, encased in a non-corrosive shell 34, and to provide with guides 35 and 36 fitted to slide longitudinally in the barrel and cut out to permit the ink to pass freely thereby.

To permit air to enter the interior of the point section 27 without permitting the ink to leak therefrom, I, in this embodiment of my invention, form an annular air groove 37, around the extension 26, next to the head of the section 27 and connect it by an inclined air duct 38 through the head of the section with the bore thereof. I also form the lower end of the sleeve 29, next to the section 26 with an annular air channel 39, and connect the channel 39 with the annular air groove 37 by air holes 40 through the inner wall of the sleeve channel and with the outer air by an air hole 41 through the outer wall of the channel 39, so that by this very circuitous path, air is admitted through the air hole 41, the channel 39, the air holes 40, the groove 37 and the duct 38, into the bore of the section 27, and the ink thus permitted to flow freely in writing, while owing to the crooked angular and very minute character of the path, the ink is effectually prevented from escaping from the interior of the pencil.

In the modified form of my invention shown in Figures 3 and 4, the ink-stopping air path is through an angular air duct 42 leading inward from the side of the sleeve 43 and thence longitudinally to the lower end thereof, thence through an annular air channel 44 in the upper end of the section head registering with the duct 42, thence through an inclined air hole 45, in the sleeve 43, thence through an annular groove around the section extension 46, and thence through an inclined hole 47, leading into the bore of the point section.

In the form of my invention shown in Figures 5 and 6, the ink-stopping air path is through a hole 48 in the side of the section 49, into an annular channel 50, formed between the sleeve 51 and the section 49, thence through holes 52 through the sleeve 51, into an interior annular groove 53 between the sleeve 51, and the section 49, and thence through a hole 54, into the bore of the section.

In the form of my invention shown in Figures 7 and 8, the ink-stopping air path is through a hole 55, in the shoulder of the section 49$^a$, to be closed by the cap 56, to an annular channel 57 between the section and sleeve 51$^a$, through a hole 58, into an annular channel 59 between the sleeve and the section and thence through a hole 60 to the section bore.

In the form of my invention shown in Figures 9 and 10, the ink-stopping air-path is through a hole 61, from the shoulder of the section 49$^b$ to an annular groove 62 in the upper end of the section head, and thence through an inclined air-duct 63, into the bore of the section.

In Figures 11 and 12, the ink-stopping air path is through a hole 64, through the shoulder of the section 49$^c$ to an annular groove 65 in the end of the barrel, and thence through an inclined hole 66 in the section into the bore thereof.

In Figures 13 and 14, the ink-stopping air path is through a hole 67, through the shoulder of the section 49$^d$ to an annular groove 68 in the upper end of the section head, and thence through an inclined opposite air hole 69, into the bore of the section.

In Figures 15 and 16, the ink stopping air path is through a hole 70 through the shoulder of the section 49$^d$ to an annular groove 71 in an intervening sleeve 72, and thence through an inclined opposite hole 73, into the bore of the section.

In Figures 17 and 18 the ink stopping air path is through a hole 74, through the shoulder of the section 49$^f$ to registering annular grooves 75, 76, in the section and sleeve 78 respectively, and thence through an inclined opposite hole 79 into the bore of the section.

In Figures 19 and 20, the ink stopping air-path is through a hole 80 in a lower sleeve 81, to registering annular grooves 82, 83, in the sleeve 81 and section 49$^g$, through a hole 84 in a section flange 85, into registering annular grooves 86, 87, in an upper sleeve 51$^g$ and the section, and through an inclined hole 88 into the bore of the section.

In Figures 21 and 22, the ink stopping air-path is through a hole 89, through the shoulder of the section 49$^h$ into registering annular grooves 90, 91, in the end of the barrel and the section extension, and thence through an inclined opposite hole 92, into the bore of the section.

It must be understood that I do not confine my invention to any of the particular forms thereof herein shown and described, as the same may be further varied without departure from its boundaries, for a definition of which reference is to be had to the following claims:

I claim as my invention:

1. An ink pencil comprising a hollow container closed at its upper end, a hollow point section removably joined to the lower open end of the container, and a needle mounted at the end of a weighted stem to reciprocate longitudinally within the opening in the tip of the section, the stem being extended through the section into the container and provided, immediately above the inner end of the section, with a guide-head slidingly engaging the surrounding wall of the container.

2. An ink pencil comprising a barrel, a hollow point section removably joined to the lower open end of the barrel, and a needle mounted at the end of a stem to reciprocate longitudinally within the opening in the tip of the section which stem is extended inwardly beyond the inner end of the section and is there enlarged to provide a head adapted to slidingly engage the surrounding annular wall to hold the stem within the section from contact with the walls thereof and by engaging the inner end of the section to limit the outward movement of the needle.

3. An ink pencil comprising a hollow container, a hollow point section removably joined to the lower open end of the container and provided with an aperture in its tip, and a weighted stem, carrying at its lower end a needle, which is located partly within the section and partly within the container above the section and is free to reciprocate by gravity to a limited extent therein and thereby to reciprocate the needle within the aperture of the section and which solely by sliding engagement with the walls of the container is held out of contact with the walls of the section.

4. An ink pencil comprising a container, a hollow point section, and a needle mounted to reciprocate longitudinally within the aperture in the tip of the section and having a stem which extends through the section and immediately beyond the inner end of the section carries an enlarged guide-head slidingly engaging the inner walls of the container and serving as a stop to limit the outward movement of the stem and needle.

5. An ink pencil comprising a barrel, a hollow point section removably joined to the open end of the barrel, a needle mounted to reciprocate longitudinally within the opening in the tip of the section and having a stem which extends into the barrel and is adapted to engage the closed inner end of the barrel to limit the inward movement of the needle and which carries an enlarged guide-head slidingly engaging the walls of the barrel adjoining the inner end of the section and adapted both to maintain the stem out of contact with the walls of the section and to limit the outward movement of the needle.

6. An ink pencil comprising a barrel, a hollow point section, a needle mounted to reciprocate longitudinally within the opening in the tip of the section and having a stem formed of a heavy metal core encased in a covering of non-corrosive material.

7. An ink pencil comprising a barrel, a hollow point section adapted to receive a longitudinally reciprocating needle and having an enlarged portion providing a shoulder and an externally threaded extension which screws into the internally threaded open end of the barrel to seat the shoulder of the section against the end of the barrel, and as means for venting the pen an annular groove which is formed around the section between the shoulder and the threaded end and is connected on one side to the exterior of the pen by a duct formed within and extending longitudinally through the enlarged portion of the section and on the opposite side to the interior of the pencil by a duct extending inwardly through the wall of the section.

8. An ink pencil comprising a barrel, a hollow point section with an enlarged portion providing a shoulder and with an externally threaded extension which screws into the internally threaded open end of the barrel to seat the shoulder of the section tightly against the end of the barrel, a needle mounted to reciprocate longitudinally within the section and having a stem which extends into the barrel beyond the section and is there provided with means, having no connection with the barrel except a sliding engagement with its walls adapted both to maintain the stem in axial alignment with the bore of the section and to limit the movement of the needle in both directions, and as means for venting the pen an annular channel formed in part by the section and in part by the barrel and connected at one point to the exterior of the pen and at another point by a duct extending inwardly through the wall of the section.

JOSEPH WALLACE.